March 8, 1966  D. J. ROSENBERG  3,238,835
ACOUSTIC INSULATION FASTENER
Filed Jan. 23, 1964  2 Sheets-Sheet 1
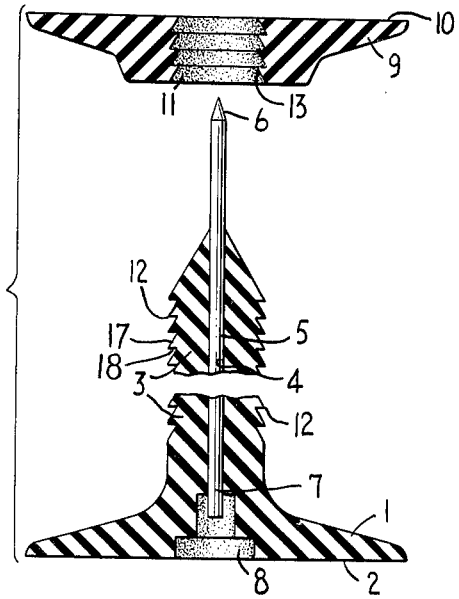
FIG. 1
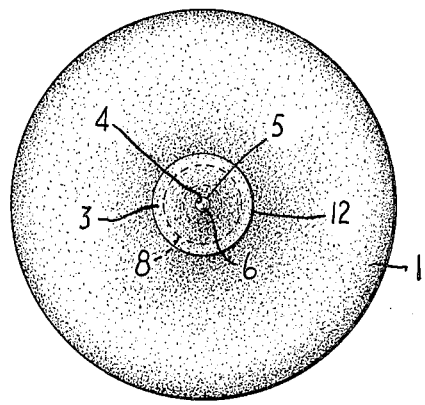
FIG. 2
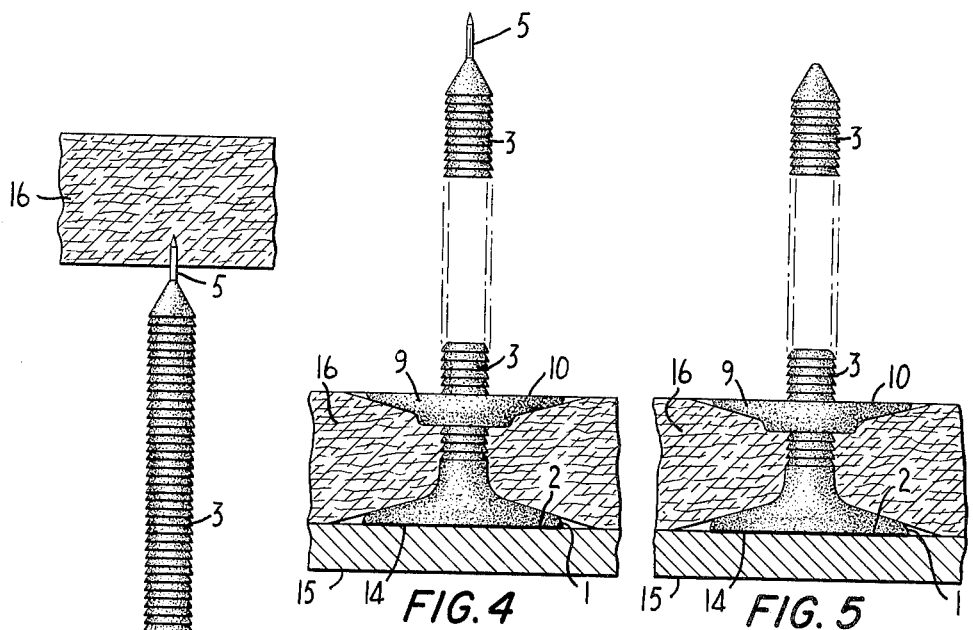
FIG. 3
FIG. 4
FIG. 5
FIG. 6

March 8, 1966   D. J. ROSENBERG   3,238,835
ACOUSTIC INSULATION FASTENER

Filed Jan. 23, 1964   2 Sheets-Sheet 2

3,238,835
ACOUSTIC INSULATION FASTENER

David J. Rosenberg, Luzerne County, Pa., assignor, by mesne assignments, to Certain-Teed Fiber Glass Corporation, Ardmore, Pa., a corporation of Maryland
Filed Jan. 23, 1964, Ser. No. 339,634
7 Claims. (Cl. 85—7)

This invention relates to a fastener for securing acoustic insulating materials to the inside of the hulls of vessels, and more particularly, to fasteners which are not themselves capable of sound transmission, and are of particular utility in submarines.

Modern commercial and naval vessels have come to rely upon sonar to an ever increasing extent. In the modern submarine, for example, sonar is used both as a navigation submarine, for example, sonar is used both as a navigational tool and as a means for obtaining tactical information and, of necessity, has, in recent years, largely replaced visual perception through periscopes for these purposes. As a navigational instrument for submarines, sonar yields precise information on the depth of water beneath the keel, detects the presence of unforseen obstacles in the submarine's path, such as uncharted rocks and the like, and also gives precise measurements of submerged depth. There is thus extensive and in some cases almost continuous use of the submarine's sonar apparatus, whenever the submarine is submerged, which may be for weeks at a time.

Sonar transmissions and reflections are normally of a frequency in excess of 1000 cycles per second (c.p.s.), and have a high intensity, although audibility may be low. The sonar reflections are received by the hull and transmitted thereby to the interior, where they cause a problem to the crew. Prolonged exposure to frequencies of high intensity above about 1000 c.p.s. can produce adverse physiological effects upon the auditory system, and, if continued for a prolonged period, can result in partial or even total loss of hearing. Therefore, sustained use of sonar for long periods of time requires that the crew be protected from sonar reflection.

To reduce such reflections, it has been customary to line the interior of the pressure hull of the submarine with a layer of an acoustic insulating material, such as glass fiber mats or bats. This layer of acoustic insulating material is conventionally referred to as the hull-board, and is fastened to the hull. Metal fasteners of various types have been used. One form has a stud attached to the hull and upon which a washer is mounted to retain the hull-board. However, this fastener itself transmits the reflections. Hence, to minimize transmission of the sound, a spring fastener has been proposed in which one end of the spring attaches to the stud, and the other end of the spring extends through a hole in the hull-board and is fastened to a plate on the inside surface of the hull-board. The plate is pulled towards the hull by the spring, which is under tension, and thereby retains the hull-board in contact with the hull. This reduces the diameter of metal available for sound transmission, and thus merely reduces but does not prevent sonar reflection transmission, since there is still metal-to-metal contact between the inside and outside of the hull.

In accordance with the invention, a fastener is provided comprising a shank of a resilient flexible acoustic isolating material adapted at one end for attachment to a hull, and, associated with the shank, a rigid support pin, and a retaining member also made of a resilient flexible acoustic isolating material. The rigid support pin is removable and is preferably disposed within the shank and extends longitudinally therethrough. The retaining member is supportable on the shank and is adapted to retain acoustic insulating material on the shank against the hull. Preferably, securing means is provided for holding the retaining member on the shank.

The only parts of the fasteners which connect the hull to the vessels' interior are the shank and the retaining member, or, in some embodiments, the retaining member alone. To obviate the possibility of sound conduction through these parts, they are made of resilient flexible acoustic isolating material. Acoustic isolating materials dissipate sound energy by internal hysteresis rather than transmit it. Such materials are characterized by being subject to elastic deformation over a wide range of deflection and have a low modulus of elasticity. Suitable materials include the synthetic plastics and elastomers, both natural and synthetic. Suitable plastics are exemplified by nylon, polyethylene, polypropylene, polystyrene, polyvinyl chloride, and polyvinylidene chloride resins, polymers of terephthalic acid and ethylene glycol, alkyd resins and polyacrylate resins. Suitable elastomers include natural rubber, Buna-N, Buna-S, polybutadiene, polyisobutylene, polyisoprene, polychloroprene ("neoprene"), Viton A, and the thiokols.

The elastomers are particularly suitable materials as they are partially compressed during installation of the hull-board. The hull-board itself becomes partially compressed with wear, and thus when it is installed under compression initially, the flexibility of the fastener permits it to take up and thereby compensate for the subsequent compression of the hull-board.

A particularly preferred material is a carbon-black extended polychloroprene rubber. This material has an excellent resistance to conducting sound, is comparatively inexpensive, is easy to fabricate, does not change its properties appreciably on aging, and is highly resistant to the oils and greases which are likely to be found on shipboard.

The shank is secured to the hull in such a manner as to extend outwardly therefrom into the interior of the ship. The shank extends through the hull-board and acts as a stud to support the hull-board, while the retaining member holds the hull-board securely against the hull.

The hull-board to be secured with the fasteners of the invention is normally unpierced, and must be pierced to permit passage of the shank therethrough. This is most conveniently accomplished by simply pressing the hull-board down over the shank, allowing the shank to pierce it and form its own hole. To facilitate this, the shank of the fasteners of the invention can be fitted with a removable support pin extending longitudinally of the shank to impart rigidity thereto while the hull-board is being installed. This pin, having served its purpose, is then removed after installation of the hull-board, so that no rigid sound-conducting material remains exposed to the vessels' interior, to conduct sound thereinto from the hull.

The pin can be made of a metal, such as steel, brass, or Monel, or of a rigid plastic, such as, for example, urea-formaldehyde resin, phenol-formaldehyde resin, melamine-formaldehyde resin, polycarbonate resin, or polytetrafluoroethylene ("Teflon"). Preferably, to facilitate removal after the hull-board is installed, the end of the pin extends beyond the tip of the shank, so that it may be gripped, for example, by a pair of pliers and withdrawn. However, if the shank is flexible, the pin may still be removed even though it does not extend beyond the shank by compressing it to expose the pin and allow it to be removed. The pin is preferably press-fitted within the shank so that it remains in its proper position during shipment and installation of the fasteners. The end of the pin is preferably pointed, to facilitate penetration of the hull-board by the shank.

The retaining member is fitted over the end of the shank after the hull-board is installed, to hold the hull-board in position against the hull. Therefore, the retaining member preferably is of a relatively large cross-sectional area, in comparison with that of the shank, to aid in retention of the hull-board.

Preferably, the retaining member is fastened or secured to the shank. Any convenient securing means may be used, permanent (such as, for example, a bonding agent or an adhesive, or a welded, sintered or soldered bond) or removable (as in the case of a press fit, a bayonet type joint, grooves, ribs or threads). Removable means is preferred, as the hull-board can then more readily be removed and reinstalled, whenever this is required. Mechanical securing means can be formed by a configuration on the shank adapted to engage a corresponding configuration on the retaining member. The securing means therefore can be a depressed portion, such as a recessed groove or slot, or a raised portion, such as a lip, ridge or dimple on the side of the shank matched to engage, for example, a corresponding raised portion or depressed portion, of the retaining member. In a preferred embodiment of this invention, the retaining member is provided with a hole of sufficient diameter to permit the shank to pass completely therethrough upon the application of hand force, i.e., a force not in excess of that obtainable in the absence of tools, either hand or powered. The securing means comprises a series of peripheral ridges or lips on the shank adapted to engage corresponding grooves within the hole in the retaining member. These lips or ridges have an oblique face to facilitate installation of the retaining member, and an abutting face to retard removal of the retaining member. The grooves in the hole in the retaining member are complementary to the lips or ridges on the shank.

One end of the shank is adapted for attachment to the hull. Any means for attaching the shank to the hull may be used; for example, the shank may be bonded to the hull by an adhesive, such as, for example, an epoxy resin cement. The hull-end of the shank can be of larger diameter than the shank, so as to provide a larger surface available for bonding.

Alternatively, the shank may be secured to a stud, which is in turn bonded to the hull by any convenient means, such as by welding, brazing, soldering or sintering, in the case of the metal stud, or by a bonding agent or adhesive, in the case of either a metal or non-metal stud. Where a stud is employed, it need not be of an acoustic isolating material as it is not exposed to the vessels' interior. Clearly, whenever a stud is employed, some means must be provided to securely bond the shank to the stud, and thus, to the hull. The shank and stud may be bonded by an adhesive, or a mechanical bonding means may be employed. The mechanical bonding means may comprise a simple tongue and groove joint, whereby a projecting tongue within a cavity in one end of the shank would engage a groove in a raised portion of the stud to provide a simple mechanical lock. Alternatively, a self-locking fastener may be embedded within a cavity in the shank so as to engage and hold the stud. Any self-locking fastener may be used for this last described embodiment so long as it will permit motion of the stud in one direction, but will restrain motion of the stud in the reverse direction. Self-locking fasteners of this type are commercially available. One such fastener preferred for this use is called a Tinnerman washer, and is described in Soled, Fasteners Handbook, Reinhold, 1957 at page 234.

Though described primarily for use within submarines, the fasteners of this invention are useful in any type of ship, and would be used whenever crewmen on any type of ship are exposed to sonar reflections or other high intensity sound for prolonged periods.

Further objects and advantages of the invention will be apparent from a reading of the following description in conjunction with the accompanying drawings in which:

FIGURE 1 is a view in longitudinal section of an embodiment of the fasteners of the invention in which the shank is adapted to be directly fastened to the hull by means of an adhesive;

FIGURE 2 is a top view of the fastener of FIGURE 1;

Figure 7:
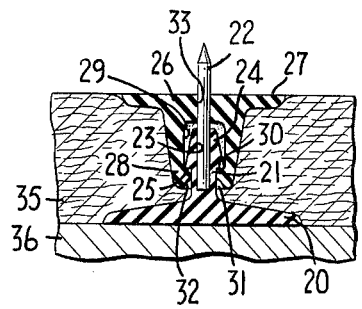
Figure 9:
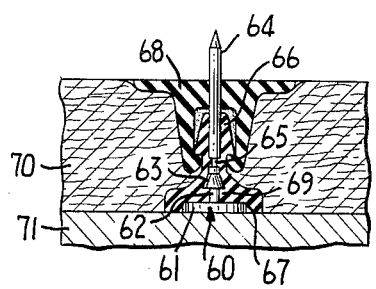
Figure 8:
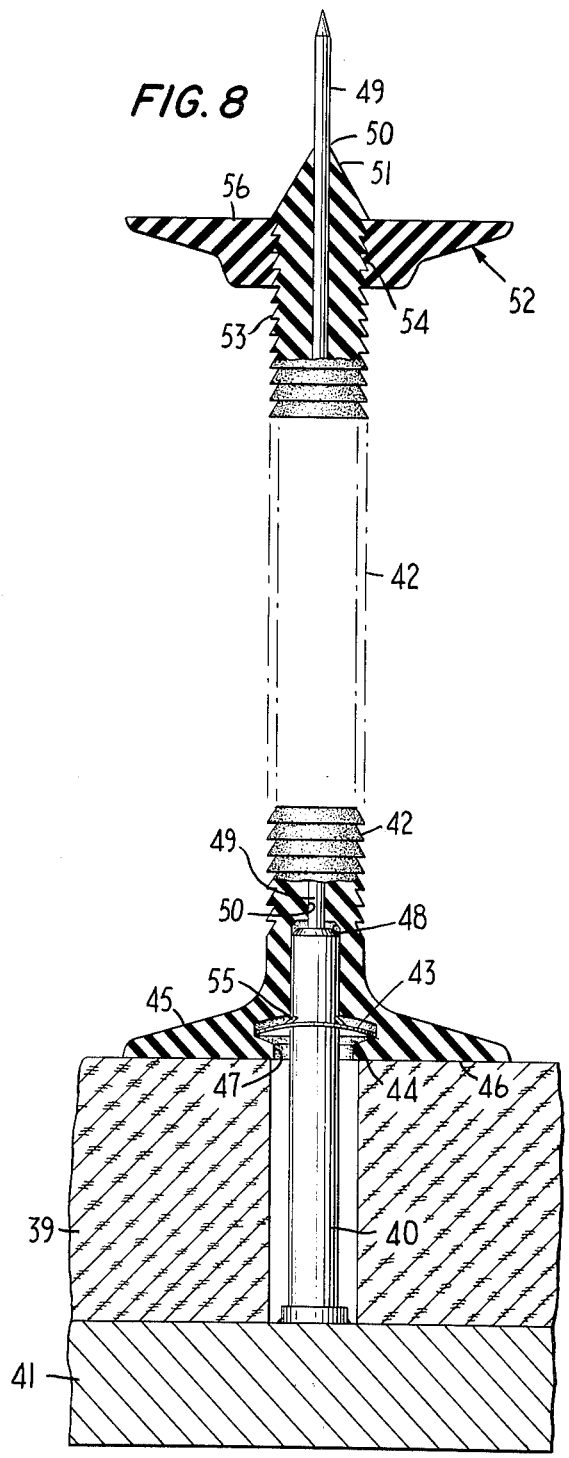

FIGURES 3 to 6 inclusive are a series of views in longitudinal section of the embodiment of the fasteners shown in FIGURES 1 and 2, which illustrate the successive steps in the installation of hull-board, using the fasteners of the invention, in which;

FIGURE 3 shows the fastener mounted in place on the hull with the hull-board about to be pushed down over the shank;

FIGURE 4 shows the hull-board in place abutting the hull after the installation of the retaining member;

FIGURE 5 illustrates the assembly with the retaining member in place and the pin removed;

FIGURE 6 is a fragmentary view showing a side view of the shank portion of the completed assembly and with a partial sectional view of the retaining member;

FIGURE 7 is a view in longitudinal section through another embodiment of the invention similar to that of FIGURE 1 but illustrating another means for securing the retaining member to the shank. In this view, the fastener is shown after the installation of the hull-board is substantially complete, but before the pin has been removed;

FIGURE 8 is a view in longitudinal section, through embodiment of the invention similar to that of FIGURE 7, wherein the shank is fastened to a stud which is, in turn, bonded to the hull. In this embodiment, there is also illustrated the mode of installation to be used where a cork interlayer is disposed between the hull and the hull-board;

FIGURE 9 is a view in longitudinal section similar to that of FIGURES 7 and 8 through another embodiment of the invention, wherein the pin is integral with a stud bonded to the hull and is made removable by fracturing the pin at a predetermined point where the pin has been weakened to facilitate such fracture.

The fastener illustrated in FIGURE 1 comprises a shank 3 having a lower portion 1 of expanded diameter. The lower portion 1 has a flat smooth lower surface 2 of comparatively large surface area with respect to the cross-sectional area of the shank to provide an extended surface available for bonding to the hull and thus to provide a stronger, more durable connection. The shank 3 extends away from the hull in a direction essentially perpendicular thereto. Extending longitudinally through the shank is a hole 4 through which a pin 5 is inserted. The pin which may be of metal or a rigid plastic, such as, for example, a phenol-formaldehyde resin, has a sharp point 6 at the end projecting beyond the tip of the shank. The pin is preferably press-fitted within the hole in the shank so that it is retained in position during shipment and installation. The press-fit, however, is not so tight as to prevent withdrawal of the pin with the aid of simple hand tools, such as pliers, after installation. The lower end 7 of the pin 5 may, as illustrated in FIGURE 1, extend downward into the lower portion 1 of the shank, but care must be taken to ensure that it does not extend so far downward as to reach the lower surface 2 thereof, since, were this to occur, the bonding means used to secure the shank to the hull might also bond the pin and prevent its later removal.

As the bonding means used in this embodiment is an adhesive, such as, for example, an epoxy resin cement, care must be taken to prevent any excess adhesive from accumulating so as to bond the pin and prevent its removal. Therefore, the lower end of the hole 4 is of expanded diameter so as to form a cavity 8 extending downward into the lower portion 1 of the shank to the lower surface 2 thereof.

The retaining member 9, as shown in FIGURE 1, is normally supplied as a separate piece to be placed on the shank after the hull-board is mounted. The retaining member has an extended flat upper surface 10, so that, after installation, it will not project beyond the surface of the hull-board. In this embodiment, the retaining member is provided with a hole 11 extending fully through the retaining member from the lower to the upper surface thereof, so that the shank may pass completely therethrough upon the application of sufficient force.

To maintain the retaining member in position on the shank after the hull-board is mounted, securing means are provided, which, in this embodiment, are a series of lips or ridges 12, extending circumferentially around the shank. Matching grooves 13 are provided within the hole 11 in the retaining member which extend around the periphery of the hole. The ridges 12 on the periphery of the shank each have an oblique face 17 and a substantially radially extending abutment face 18. The oblique faces slope sharply toward the end of the shank adapted for securing to the hull, while the abutment faces have a much lesser slope or are even parallel with the flat lower surface 2 of the expanded lower portion 1 of the shank. The grooves 13 in the hole 11 of the retaining member are correspondingly arranged and are complementary to the ridges on the shank. Thus, as the retaining member is thrust down upon the shank, the oblique faces of the ridges 12 and the complementary oblique faces of the grooves 13, slide one over the other and installation is facilitated. But, when trying to remove the retaining member, the abutment faces come into contact with one another and substantially greater force is then required to effect removal.

In this embodiment, all parts of the fastener, except the pin 5, are made of a flexible resilient acoustic isolating material, such as, for example, a polychloroprene rubber.

To install the hull-board using this embodiment of the fasteners of the invention, the shank of the fastener is first bonded to the metal hull, as shown in FIGURE 3. The bonding means used is a layer of adhesive 14 between the hull 15 and the flat lower surface 2 of the lower portion 1 of the shank. Any adhesive capable of giving a firm bond between a metal and a non-metal surface can be used, such as, for example, an epoxy resin cement, a polyvinyl alcohol formulation, a urea-formaldehyde resin, or the like.

After the fastener is bonded to the hull, the hull-board 16 is passed down over the shank until it abuts the hull, as shown in FIGURE 4. The sharpened point 6 at the end of the pin 5 facilitates penetration of the hull-board.

The retaining member is placed over the shank and pushed down until its flat upper surface 10 is flush with the surface of the hull-board as shown in FIGURE 4. The pin 5 is left in place while this is done to keep the shank rigid until the retaining member is forced into place. The pin may then be removed to present the structure shown in FIGURE 5. The hull-board 16 is securely held between the retaining member 9 and the hull 15.

The portion of the shank extending beyond the upper surface 10 of the cap-piece may then be cut off to yield the flush-fitting assembly shown in FIGURE 6. This finished assembly securely retains the hull-board in position and will not conduct sound as there is no metal-to-metal contact between the hull and the interior of the hull. As the fastener itself is of an acoustic isolating material, no sound will be conducted by the fastener. Another advantage of this embodiment of the invention is that the fastener can be readily adapted to any thickness of the hull-board.

The embodiment depicted in FIGURE 7 illustrates another mode of securing the retaining member to the shank. As in the embodiment of FIGURES 1 to 6, this embodiment comprises a shank 21 having a lower portion 20 of extended surface. A longitudinal pin 22 is pressed into a cavity 23 in the shank. The shank 21 in unlike that of the embodiment of FIGURES 1 to 6, however, in that the shank is not of substantially uniform diameter throughout its length, and the shank has no ridges thereon. At a predetermined point, calculated with reference to the thickness of the hull-board to be secured, the shank is undercut to form an outwardly projecting lip 24 having a flat lower face 25. The retaining member 26 is formed with an extended flat upper surface 27, and an elongated downwardly projecting frustoconical portion 28 within which is a cavity 29. The cavity 29 is essentially cylindrical and entrance thereto is gained through a hole 31 in the lower face of the frustoconical portion of the retaining member. The diameter of the hole is smaller than that of the cavity 29, so that, in effect, the lower end of the cavity projects inwardly to form a lip 30 of a width corresponding to the depth of the undercut on the shank. The lower edge 32 of the hole 31 is chamfered or bevelled to facilitate insertion of the shank into the cavity.

Extending between the cavity 29 and the upper surface 27 of the retaining member 26 is a second hole 33, the diameter of which is slightly greater than that of the pin 22. The pin, when inserted through the hole, guides the retaining member into place so that the shank may be readily inserted into the hole 31 and enter the cavity 29.

In use, the shank is bonded to the metal hull as described above in connection with the embodiment of FIGURES 1 to 6. The hull-board 35 is then pressed down over the shank 21 until it abuts the hull 36. The retaining member is then placed over the shank such that the pin 22 enters the hole 33 in the upper portion of the retaining member and the retaining member is then pushed down until the shank engages the lower chamfered edge 32 of the hole 31 in the frustoconical portion 28 of the retaining member. Additional force is then applied so that the shank first distends the portion of the retaining member defining the hole 31 and then enters fully into the cavity 29, whereupon the resilient material of which the retaining member is formed springs back into its normal position, engaging the undercut portion of the shank, thereby locking the retaining member into place. The hull-board is thus securely held between the cap-piece and the base, and the retaining member is firmly held in position by the abutting surfaces of the inwardly projecting lip 30 of the retaining member and the lower face 25 of the lip 24 on the shank. After the retaining member is in place, the pin 22 is then removed and the hull-board securely held in place by a fastener of an acoustic isolating material, which is incapable of conducting sound.

The embodiment of the fasteners of the invention shown in FIGURE 8 employs a cylindrical stud 40 which may be of a metallic material bonded to the hull 41 by, for example, welding. Immediately abutting the hull is an interlayer of cork 39 through which the stud extends so that it projects beyond the cork. The shank 42 is secured to the base 40 by a self-locking fastener 43 which, in this embodiment, is a Tinnerman washer. Any self-locking fastener which may readily be pushed onto a stud and freely moved in one direction, but which is so arranged as to dig in and resist movement in the opposite direction, may also be used. The self-locking fastener 43 is inserted in a cavity 44 in an enlarged lower portion 45 of the shank. Preferably, the enlarged lower portion of the shank has an extended flat lower surface 46 in contact with the cork so that a smooth joint is obtained. If desired, the surface 46 may also act to secure the cork to the hull and obviate the need for additional fasteners for the cork. The surface 46 may also be cemented to the cork by an adhesive to provide additional strength to the mounting. The self-locking fastener is retained within the cavity 44 by the inwardly projecting lip 47 so that the shank may not be pulled away from the fastener and, hence, from the stud. Extending longitudinally upwards within the shank is a second cavity 48 which, at its lower end, opens into the cavity 44, wherein the self-locking fastener 43 is positioned. The cavity 48 permits the stud 40 to be inserted through and to extend beyond the fastener 43.

The pin 49 is inserted into hole 50 which extends longitudinally through the shank from chamber 48 to the tip 51 of the shank. As in the case of the previous embodiments, the pin is press-fitted within the hole 50. The upper end of the pin extends beyond the tip 51 and is pointed to facilitate penetration of the hull-board. The retaining member 52 and the securing means on the shank 53 and within the retaining member 54 are identical to those described above in connection with the embodiment of FIGURES 1 to 6.

To install hull-board sections using the fastener illustrated in FIGURE 8, the stud 40 is first bonded to the hull 41, by, for example, welding. The cork interlayer is then installed so that it abuts the hull and is secured in place. The stud 40 projects through and extends beyond the cork. If desired, the cork may be secured in place by separate fasteners, or it may be secured without separate fasteners since the outwardly flaring portion 45 of the shank extends beyond the hole in the cork layer, through which the stud 40 projects, and can thus hold the cork in place. Once the cork is in place, the shank 42 may be secured to the base by placing the shank over the base in such a way that the stud enters into the hole 44 in the lower end of the shank. The shank is then pushed down over the stud so that the stud passes through the Tinnerman washer 43 and enters into the cavity 48 until it can penetrate no further, being stopped either by the stud reaching the end of the hole 48 or by the outwardly flaring portion 45 of the base abutting the cork interlayer, whichever should first occur. If desired, the strength of the connection between the shank and the stud can be increased by cementing the flat lower surface 46 of the shank to the cork. The Tinnerman washer is so arranged that it will readily permit insertion of the stud, but whenever an attempt is made to remove the shank the two spring tabs 55 on the Tinnerman washer dig into the stud and resist such motion.

After the shank is secured to the stud, the hull-board is pressed down over the shank until it abuts the cork interlayer. Penetration of the hull-board is facilitated by the sharp point at the end of the pin 49 and the tapered tip 51 on the end of the shank. After the hull-board is in place, the retaining member 52 is inserted over the shank and pressed down until the flat upper surface 56 thereof abuts and is flush with the hull-board. The pin imparts rigidity to the shank during these operations. After the retaining member is in place and securely held therein by the securing means in the manner described above in connection with the embodiment of FIGURES 1 through 6, the pin is withdrawn by grasping the tip with, for example, a pair of pliers and pulling it loose. The portion of the shank extending beyond the upper surface 56 of the retaining member 52 may then be cut off to give a flush-fitting assembly which has no sound conducting component opening into the interior of the vessel's hull. As the components exposed to the vessel's interior are manufactured of a flexible resilient acoustic isolating material, such as, for example, polychloroprene or polyethylene, the fastener is incapable of conducting sound.

The embodiment of FIGURE 9 illustrates a fastener of the invention wherein the removable pin is integral with a stud. This embodiment comprises a stud 60, having a flat plate 61 bondable to the hull by, for example, welding, in the case of a metal stud. Extending vertically upwards from the plate 61, and integral with it, is a shaft subdivided into four sections. The first section, directly connected to the plate, is a cylindrical section 62 of uniform diameter. This is followed by a frustoconical section 63, the base diameter of which is greater than the diameter of the cylindrical section 62.

This is followed by the pin 64 having a portion 65 of narrower diameter than that of the pin. The shank element 66 is formed with a cavity 67 conforming to the shape of the stud element 60. The retaining member 68 and securing means of this embodiment are identical to those described in connection with the embodiment of FIGURE 7, and hence, the description will not be repeated here.

In use, the flat plate 61 of the stud element 60 is bonded to the hull 71. The shank element 66 is then pressed down over the shaft rising from the plate 61 until the portions of the central cavity 67 conforming to the shape of the shaft, are in contact with the mating section of the shaft. When this occurs, the inwardly projecting lip 69 within the central cavity 67 of the shank element is beneath the outwardly extending frustoconical section 63 of the shaft, and thus, locks the shank element in place. The hull-board 70 is then pressed downward over the pin 64 and the shank element 66 until it abuts the hull, whereupon the retaining member is inserted and held in place by the securing means in the manner described in connection with the embodiment of FIGURE 7. The pin is then rocked to-and-fro until fatigue fracture occurs at the portion of narrowest diameter of the shaft portion of the stud, i.e., at portion 65 of the shaft. Thereupon, the pin may be removed leaving only those components formed of a resilient flexible acoustic isolating material exposed to the interior of the hull of the vessel. Hence, the fastener is incapable of conducting sound.

Although the invention has been described herein with reference to specific embodiments, many modifications and variations thereof will readily occur to those skilled in the art. Accordingly, all such variations and modifications are included within the intended scope of the invention as defined by the following claims.

The following is claimed:

1. An acoustic insulation fastener for securing acoustic insulating material to a vessel's hull, comprising, a shank portion of resilient flexible acoustic isolating material adapted at one end for attachment to a hull, said shank having an axial bore, a removeable, elongated pin in said bore, said pin imparting rigidity to said shank, a retaining member of a flexible resilient acoustic isolating material fitting over the shank and supportable thereon, adapted to retain acoustic insulating material on the shank against the hull, and securing means to maintain the retaining member on the shank.

2. An acoustic insulation fastener in accordance with claim 1, wherein the rigid support pin extends beyond the tip of the shank.

3. An acoustic insulation fastener in accordance with claim 1, comprising a stud bondable to the hull and attaching means for fastening the shank to the stud, whereby the shank is attached to the hull.

4. An acoustic insulation fastener in accordance with claim 1, wherein the acoustic isolating material is an elastomer.

5. An acoustic insulating fastener in accordance with claim 4, wherein the acoustic isolating material is a polychloroprene rubber.

6. An acoustic insulation fastener for securing acoustic insulating material to a vessel's hull, comprising, a shank portion of resilient flexible acoustic isolating material adapted at one end for attachment to a hull, a rigid elongated support pin removably disposed within the shank and extending over a major portion of its length, and a retaining member of a flexible resilient acoustic isolating material fitting over the shank and removably supportable thereon, adapted to retain acoustic insulating material on the shank against the hull.

7. An acoustic insulation fastener for securing acoustic insulating material to a vessel's hull, comprising:
a shank portion of resilient flexible acoustic isolating material, said shank having an axial bore;
a stud bondable to the hull;
a rigid elongated support pin within said bore, said pin being integral with said stud, the end of said pin opposite the stud extending beyond the top of said shank;
said pin having a frangible portion to facilitate fracture at a predetermined point within the bore;
means on said pin intermediate the stud and the frangible portion and engageable with the walls of said bore for retaining the shank on the stud;
a retaining member of a flexible resilient acoustic isolating material fitting over the shank and supportable thereon; and
means including cooperating gripping surfaces on said shank and said retaining member for securing the retaining member to the shank.

References Cited by the Examiner

UNITED STATES PATENTS

| | | | |
|---|---|---|---|
| 553,938 | 2/1896 | Reichelt | 85—1 |
| 643,045 | 2/1900 | Denis | 85—7 |
| 1,109,094 | 9/1914 | Weckbaugh | 85—1 |
| 2,345,768 | 4/1944 | Nelson | 85—36 |
| 2,590,175 | 3/1952 | Hajdu | 24—217 |
| 2,656,902 | 10/1953 | Gotshall | 85—36 |
| 2,901,796 | 9/1959 | Hope | 24—217 |
| 3,069,962 | 12/1962 | Rapata | 85—8.8 |

FOREIGN PATENTS 651,985  11/1962  Canada.

CARL W. TOMLIN, *Primary Examiner.*

M. PARSONS, Jr., *Assistant Examiner.*